No. 682,108. Patented Sept. 3, 1901.
M. M. MOVSHOVITCH.
TIME REGULATOR FOR ELECTRIC MOTORS.
(Application filed Mar. 19, 1901.)
(No Model.) 2 Sheets—Sheet 1.
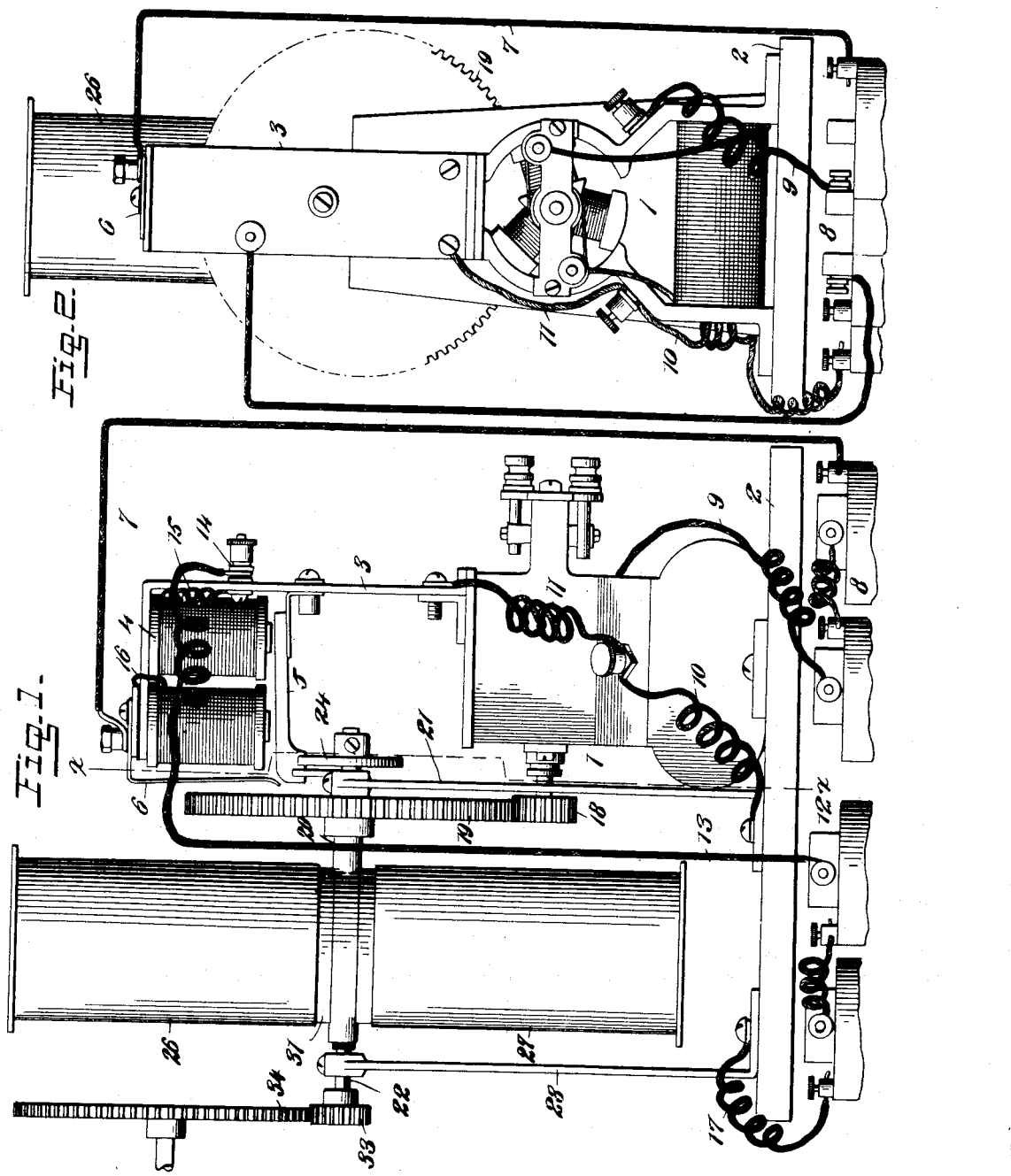
WITNESSES:
INVENTOR
Max M. Movshovitch
BY
ATTORNEYS No. 682,108. Patented Sept. 3, 1901.
M. M. MOVSHOVITCH.
TIME REGULATOR FOR ELECTRIC MOTORS.
(Application filed Mar. 19, 1901.)

(No Model.) 2 Sheets—Sheet 2.

WITNESSES:
James F. Duhamel
C. R. Ferguson

INVENTOR
Max M. Movshovitch
BY
ATTORNEYS

UNITED STATES PATENT OFFICE.

MAX MENSON MOVSHOVITCH, OF NEW YORK, N. Y.

TIME-REGULATOR FOR ELECTRIC MOTORS.

SPECIFICATION forming part of Letters Patent No. 682,108, dated September 3, 1901.

Application filed March 19, 1901. Serial No. 51,863. (No model.)

*To all whom it may concern:*

Be it known that I, MAX MENSON MOVSHOVITCH, a citizen of the United States, and a resident of the city of New York, borough of Manhattan, in the county and State of New York, have invented a new and Improved Time-Regulator for Electric Motors, of which the following is a full, clear, and exact description.

This invention relates to improvements in devices for regulating and controlling the time of movement of an electric motor; and the object is to provide a simple automatic device for this purpose which is especially adapted for use in connection with hands movable over a time-dial, such as a clock-dial, although it will be found useful when the motor is designed to operate other devices at stated divisions of time.

I will describe a time-regulator for electric motors embodying my invention and then point out the novel features in the appended claims.

Reference is to be had to the accompanying drawings, forming a part of this specification, in which similar characters of reference indicate corresponding parts in all the figures.

Figure 4:
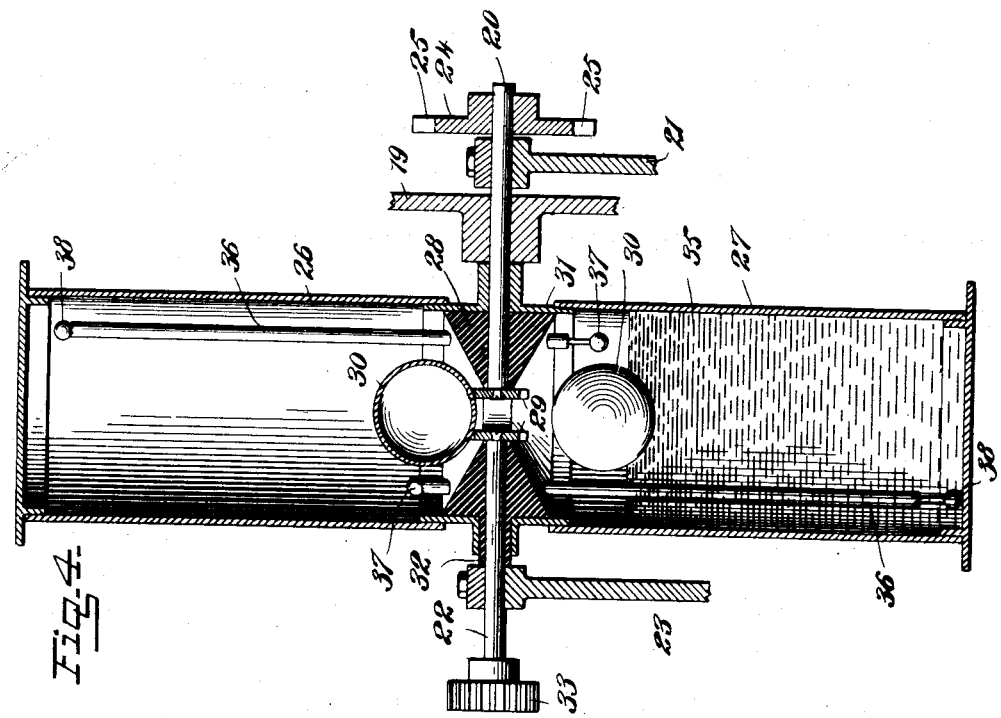
Figure 3:
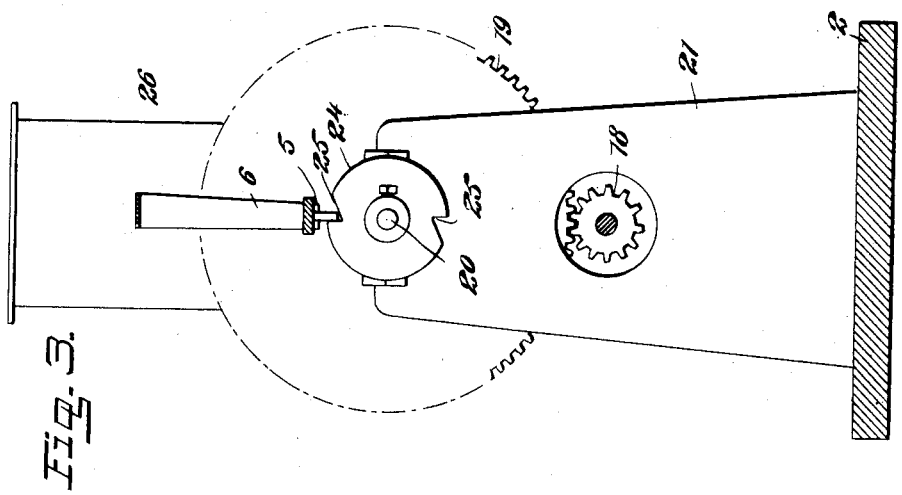

Figure 1 is a side elevation showing a device embodying my invention. Fig. 2 is a rear elevation of the same. Fig. 3 is a section on the line *x x* of Fig. 1, and Fig. 4 is a section through the circuit-closing device.

Referring to the drawings, 1 designates an electric motor mounted on a suitable base 2, and supported on the motor is a frame 3, of electric conducting material, and attached to the horizontally-disposed upper portion of this frame is an electromagnet 4, which coacts with an armature 5, mounted to swing on the upright portion of the frame 3. This armature 5 is designed to close the electric circuit through the motor by engaging with a spring contact-finger 6, mounted on the frame 3 and from which a wire 7 leads to a battery 8, and from this battery 8 a wire 9 leads to the motor. From the base 2 another wire 10 leads to said motor, while from the binding-screw, to which this wire 10 is connected, a wire 11 leads to a connection with the frame or standard 3. From another battery 12 a wire 13 leads to a binding-post 14, mounted on the frame 3, but insulated therefrom, and from this binding-post a wire 15 extends to a connection with one end of the electromagnet, and from the other end of the electromagnet a wire 16 extends to electrical connection with the frame 3 and leads to the battery through the wires 11 10, the base, and a wire 17.

On the motor-armature shaft is a pinion 18, meshing with a gear-wheel 19, connected to a shaft-section 20, supported at one end in an upright 21, and at the outer end of the shaft-section 20 a similar shaft-section 22 is supported in an upright 23. On the inner end of the shaft-section 20 is a stop-wheel 24, which has opposite notches 25, in which the free end of the armature 5 may engage. Mounted on the shaft-sections 20 and 22 is a cylinder consisting of two compartments 26 and 27, and arranged between these compartments is a ring 28 of insulating material and through the opening of which a liquid is designed to pass from one compartment to the other, as will be hereinafter described. The shaft-sections 20 and 22 pass into and are connected with said ring 28 of insulating material. It will be seen that the opposite sides of this ring are concaved, and at a point near the opening of said ring and electrically connected to the shaft-sections 20 and 22 are contact devices 29, designed to be engaged to close the circuit by cylindrical float devices 30 in the cylinder-compartments. For the purpose of strengthening the circuit-closing device or cylinder the ring 28 is secured within a metal ring 31, to which the ends of the cylinder sections or compartments are connected, and it will be noted that the shaft-section 22 is insulated from said ring 31 by a bushing 32 of rubber or other suitable material. The hands of a clock may be mounted on the shaft-section 22 and operated by a step-by-step motion at intervals of one minute. I have here shown, however, a pinion 33 as connected to said shaft-section and engaging with a gear-wheel 34, that may be connected to the machinery to be operated. Placed in the cylinder is a liquid 35, consisting, for instance, of alcohol and glycerin;

but it may consist of any other liquid that is not an electrical conductor. There will be sufficient liquid to nearly fill one section or compartment of the cylinder, as clearly indicated in Fig. 4.

In operation when the cylinder is in the position shown in Fig. 4 the upper float 30 by engaging with the contacts 29 will close the circuit through the shaft-section 22, the upright 23, the battery, the wire 13, the electromagnet 4, the frame 3, and thence back to the battery, as before described. At this time the electromagnet will be energized to attract the armature 5, which upon moving upward will release the stop-wheel 24 and come in contact with the spring-contact 6, thus closing the circuit through the motor, the current passing from the battery through the motor, the frame 3, the armature 5, the contact-finger 6, and the wire 7 back to the battery. The turning of the motor-shaft will impart sufficient motion to the gear-wheel 19 to reverse the circuit-closing device or cylinder, consisting of the sections 26 and 27. As soon as the reversing motion commences the circuit will be broken by the float 30, so that the electromagnet will be deënergized, permitting the armature 5 to drop or move downward to engage in the notch 25 of the wheel 24 opposite the notch previously engaged, and thus the hands of the clock or other device will be moved one step, and of course at this time the motor will be deënergized. The liquid in the uppermost compartment of the cylinder will now flow through the opening into the other or lower compartment, the ball or float in the upper compartment moving to the top of the liquid. After the liquid shall have fully discharged from the uppermost compartment the float of that compartment will close the circuit, as before described, and the operation of the motor will be repeated.

There should be a partial vacuum in the cylinder or just sufficient air to assist the flow of liquid from one compartment to the other, and to permit the passage of air from the lower compartment to the upper one I provide air-pipes 36, which extend through the ring 28 from a point near the ring in one compartment to nearly the outer end of the other compartment, as shown in Fig. 4, and to prevent the flow of liquid through the pipes I provide valves 37 for the inner ends of the pipes. Rods extend from the valves through the pipes and at the outer end connect with stops 38, and in order that the stops shall not close the pipes the outer ends of the pipes may be notched, as shown.

Having thus described my invention, I claim as new and desire to secure by Letters Patent—

1. A time-regulator for an electric motor, comprising a shaft having gear connection with the motor, a cylinder mounted on said shaft but insulated therefrom, said cylinder consisting of two compartments communicating one with the other, a liquid in the cylinder, and floats in the compartments for closing the electric circuit, substantially as specified.

2. A time-regulator for electric motors, comprising a two-section shaft having gear connection with the armature of the motor, a cylinder consisting of two compartments mounted on said shaft-sections but insulated therefrom, a liquid in the cylinder, floats arranged in the compartments and adapted to close an electric circuit through the shaft-sections, and an electromagnet operated by the closing of the circuit to close the circuit through the motor, substantially as specified.

3. A time-regulator for electric motors, comprising a two-section shaft, gear connections between said shaft and the motor-armature, a two-compartment cylinder mounted on said shaft-sections, a liquid in said cylinder, floats in said compartments for closing the circuit through the shaft-sections, an electromagnet controlled by said floats, and an armature for said electromagnet for closing the circuit through the motor, substantially as specified.

4. A time-regulator for electric motors, comprising a two-section shaft, a gear connection between said shaft and the motor-armature, a liquid-containing cylinder mounted on said shaft, circuit-closing floats in said cylinder, an electromagnet, an armature for said magnet, a stop-wheel on the shaft with which said armature is adapted to engage, and a contact adapted to be engaged by the armature for closing the circuit through the motor, substantially as specified.

5. A circuit-closing device for an electric motor, comprising a cylinder mounted on a shaft, said shaft having gear connection with the motor, the said cylinder comprising two sections communicating one with the other, a liquid in said cylinder, and float devices in the sections or compartments of the cylinder for closing the circuit, substantially as specified.

In testimony whereof I have signed my name to this specification in the presence of two subscribing witnesses.

MAX MENSON MOVSHOVITCH.

Witnesses:
JNO. M. RITTER,
JOHN H. KNIGHT.